(12) United States Patent
Schmid et al.

(10) Patent No.: US 7,484,448 B2
(45) Date of Patent: Feb. 3, 2009

(54) MOTOR-VEHICLE PYROTECHNIC UNIT

(75) Inventors: Günther Schmid, Röthis (AT); Novica Zelenovic, Muntlix (AT)

(73) Assignee: Hirschmann Automotive GmbH, Rankwell/Brederis (AU)

( * ) Notice: Subject to any disclaimer, the term of this patent is extended or adjusted under 35 U.S.C. 154(b) by 260 days.

(21) Appl. No.: 11/406,489

(22) Filed: Apr. 18, 2006

(65) Prior Publication Data
US 2006/0230914 A1 Oct. 19, 2006

(30) Foreign Application Priority Data
Apr. 19, 2005 (DE) .................... 10 2005 017 868

(51) Int. Cl.
*B64D 1/04* (2006.01)
(52) U.S. Cl. .................... 89/1.14; 102/378
(58) Field of Classification Search .......... 89/1.14; 102/335, 347, 378; 244/172.6, 173.3; 411/390, 411/391, 531
See application file for complete search history.

(56) References Cited
U.S. PATENT DOCUMENTS 3,077,218 A * 2/1963 Ziegler ................ 411/155
6,662,702 B1 * 12/2003 Vidot et al. .............. 89/1.14
6,851,372 B2 * 2/2005 Bender et al. ............ 102/530
6,892,832 B2 * 5/2005 Byrd ..................... 175/325.2
7,013,792 B2 3/2006 Yamaguchi
7,188,558 B2 * 3/2007 Brede et al. .............. 89/1.14
2002/0186934 A1 * 12/2002 Hug et al. ................. 385/80
2004/0255811 A1 12/2004 Brede
2007/0013197 A1 * 1/2007 Bender et al. ............ 292/201

FOREIGN PATENT DOCUMENTS

DE 103 03 377 8/2004
EP 1 162 333 12/2001
EP 1 470 971 10/2004

* cited by examiner

*Primary Examiner*—Michael Carone
*Assistant Examiner*—Samir Abdosh
(74) *Attorney, Agent, or Firm*—Andrew Wilford

(57) ABSTRACT

A pyrotechnic release unit has a generally tubular casing having an open rear end and an open front end and adapted to be secured to one of a pair of separable vehicle parts, a pin releasably retained in the front end of the housing and adapted to be secured to the other of the pair of separable vehicle parts, a support plug fittable through the rear end into the housing and carrying a pyrotechnic charge turned toward the front end, and a latch element bearing rearward on the casing and forward on the support plug and sufficiently strong that on explosion of the charge the support plug remains fixed in the casing and the pin is blown out of the front end of the casing.

11 Claims, 1 Drawing Sheet

MOTOR-VEHICLE PYROTECHNIC UNIT

FIELD OF THE INVENTION

The present invention relates to a pyrotechnic unit. More particularly this invention concerns a pyrotechnic release unit used in a motor-vehicle air bag, seatbelt tightener, or the like.

BACKGROUND OF THE INVENTION

A standard pyrotechnic release unit such as described in U.S. patent publication 2004/0255811 has a hermetically sealed pyrotechnic pressure insert that is installed at a rear end of a casing and that is comprised of a support plug carrying a gas-forming pyrotechnic charge. A detachable pin is inserted into an opposite front end of the casing at a spacing from the charge. A first securing point is provided on the casing and a second securing point is arranged on the pin that itself is anchored on the casing by an arresting and force-limiting element. The support plug is rearwardly braced so that it is not blown out of the rear of the casing when the charge explodes. This bracing can be done by crimping over the rear end of the housing after installing the support plug and charge, or by forming the housing with a mainly closed rear wall and installing the support plug and charge through the front end before the detachable pin is itself mounted in place and secured in such a manner that it can be blown loose.

In such an arrangement the casing, which typically is tubular, is secured to one part in the vehicle and another part of the vehicle is secured to a protruding end of the pin. Leads extend out of the rear end of the casing from the pyrotechnic charge to a controller so that the charge can be exploded to blow the pin out of the casing and thereby allow the two parts of the vehicle to separate, thereby initiating, for example, deployment of an air bag or locking-up of a seat-belt unwinder.

The main disadvantage of the existing systems is that the pyrotechnic charges, e.g. ignition charges or gas producers, as they are used for belt tighteners, air bags etc., have to be mounted in the release units before the release units themselves are installed in the vehicles. Since there is always the potential for accidental explosion of these charges, it is however desirable to install them as late as possible in the production process, thereby reducing to a minimum the possibility of accident. Furthermore, since the release units are normally made in special facilities and supplied assembled to the vehicle fabricators, the potential for accident is present during shipping and storage even before installation.

OBJECTS OF THE INVENTION

It is therefore an object of the present invention to provide an improved motor-vehicle pyrotechnic release unit.

Another object is the provision of such an improved motor-vehicle pyrotechnic release unit that overcomes the above-given disadvantages, in particular that can be fitted with its pyrotechnic charge relatively easily even after installation of the rest of the unit in a vehicle.

SUMMARY OF THE INVENTION

A pyrotechnic release unit has according to the invention a generally tubular casing having an open rear end and an open front end and adapted to be secured to one of a pair of separable vehicle parts, a pin releasably retained in the front end of the housing and adapted to be secured to the other of the pair of separable vehicle parts, a support plug fittable through the rear end into the housing and carrying a pyrotechnic charge turned toward the front end, and a latch element bearing rearward on the casing and forward on the support plug and sufficiently strong that on explosion of the charge the support plug remains fixed in the casing and the pin is blown out of the front end of the casing.

Thus according to the invention, when being installed into the casing a fixable latch element serves to fix the pyrotechnic charge in the casing. This latch element allows the safety system to be prefabricated at its manufacturer, without pre-installing the pyrotechnic charge. Installation of the pyrotechnic charge is then either carried out shortly before or after installing the release nit into the vehicle and the latch element itself serves for retaining the support plug and charge in the casing. This way additional manufacturing processes or mounting steps are omitted, which were necessary for the post-installation crimping, screwing, calking or similar procedures for securing the plug and charge in place. The latch element now ensures that at the same time the pyrotechnic charge is inserted into the casing the charge is fixed in place. Here, particularly latch elements come into consideration that effect the fixation by means of a locking operation. It is of particular advantage if the prefabricated safety system is available shortly before the mounting in the vehicle on the assembly line, so that shortly before mounting, the pyrotechnic charge can be installed and the safety system can be checked. If the check is positive, the operational safety system can be installed.

In a further development according to the invention the latch element is a disk or washer and when mounted bears on a shoulder or step of the casing and a shoulder or step of the pyrotechnic charge. With this embodiment the disk can be inserted into the casing so that after insertion of the pyrotechnic charge into the casing, it brings it into operating connection and permanently fixes the pyrotechnic charge in the casing. Alternatively it is also possible to fit the washer to the pyrotechnic charge and then lock them both in place on insertion of the pyrotechnic charge into the casing. In preferred embodiments, the disk is a dished washer of fan-shaped. The different geometric variables and forms of the pyrotechnic charge and the casing corresponding with it are also taken into consideration. Furthermore, the latch element, in another embodiment of the invention, consists of spring steel that has the advantage that it is deformable during insertion of the pyrotechnic charge into the casing and again reassumes its original form when fully installed. Alternatively according to the invention it is also possible that the latch element be deformed and prestressed after mounting of the pyrotechnic charge in the casing producing a force that biases the parts tightly together. This has the advantage that the pyrotechnic charge is mounted in the casing with a certain prestress so that relative motions between the pyrotechnic charge and the casing are impossible during the operation of the safety system and also manufacturing tolerances can be compensated out.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
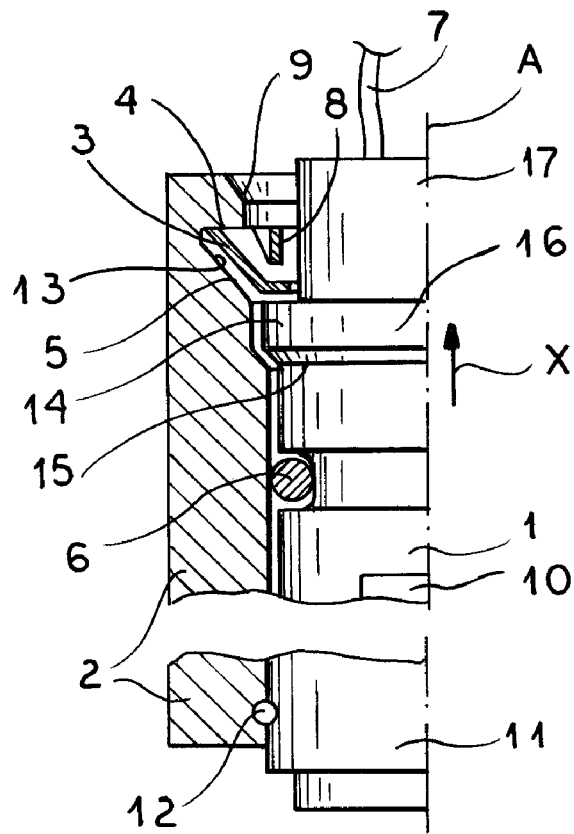
FIG. 1 is an axial section through the release unit in accordance with the invention.

FIG. 1 shows a cylindrical support plug 1 carrying a pyrotechnic charge 10 and centered on an axis A. The plug 1 fits complementarily in the cylindrical passage of a metal casing 2 that is open fully at both ends, that is that is not restricted significantly inward at either end so that its contents can be fitted both from the rear end (upward in FIG. 1) or the front end (downward in FIG. 1). The ignitable charge 10 is effective on a pin 11 of the safety system, particularly in the case of a crash of the vehicle, so that e.g. an air bag is inflated or a belt tightener is locked. The charge-support plug 1 usually has a circular cross-section, whereas however, also other cross-sections are possible. To this end the pin 11 is secured to one part of the motor vehicle and the casing 2 to another, so that as is standard when the charge 10 blows, the pin 11 and casing 2 separate. A snap ring 12 holds the pin 11 in place with sufficient force that it does not separate from the casing 2 during normal use, but when the charge 10 explodes, the ring 12 releases and the pin 11 can move out.

According to FIG. 1, a latch element 3 fits in the passage of the casing 2 and has a basically circular shape centered on the axis A. More particularly the element 3 is a dished or fan-shaped disk or washer. The latch element 3 is installed before, during, or after insertion of the charge-support plug 1 into the casing 2, and in the embodiment according to FIG. 1 snaps into a radially inwardly open locking groove 13 of the casing 2. This locking groove 13 can have a square or rectangular cross-section, in the illustrated embodiment an approximately triangular cross-section with a forwardly directed frustoconical face 5 for the latch element 3. This support face 5 bears in surface contact on the latch element prior to pressurization (ignition of the pyrotechnic charge 1) from direction X. In addition, a seal 6 as well as electrical connections 7 are shown, the seal 6 hermetically sealing the charge-support plug 1 in the casing 2 and the electrical connections 7 being connected to an unillustrated controller for ignition of the pyrotechnic charge 1. This controller detects a sudden deceleration, e.g. from a crash of the vehicle.

FIG. 1 further shows that the latch element 3 has an outer periphery fitted in a locking groove 13 having a perpendicular forwardly directed rear face or flank 4 and a frustoconical rearwardly directed front face 5. The charge-support plug 1 also has a projecting ridge 14 of cylindrical outer shape and a frustoconical front flank 15 that fit with a complementary step of the casing 2 so when fitted from the rear to the casing 2 the plug 1 becomes firmly seated and cannot move forward past the illustrated position. A rear face 16 of the ridge extends perpendicular to the axis A. The latch element 3 normally biases the plug 1 forward into solid surface contact with the casing 1 by bearing axially forward on the face 16. This effect can be helped by a projection 8, so that the latch element 3 is fixed in a mounted state between the ridge 14 of the charge-support plug 1 and the at least partially radially rotating or also in the form of a pin-shaped rotating projection 8 of the casing 2. Furthermore, the rear end of the casing 2 is formed with a frustoconical chamfer 9 that simplifies the insertion of both the charge-support plug 1 and also of the latch element 3 in the casing 2.

According to FIG. 1 the unit is assembled as follows:

The pyrotechnic and tested prefabricated plug 1 with the charge 10 is inserted axially from the rear into the casing 2. Then the latch element 3 is coaxially fitted over a small-diameter rear extension 17 of the charge-support plug 1 and moved into the casing 2 with radial inward elastic deformation of its outer periphery until this outer periphery enters the groove 13 and comes to bear against the face 4. During this procedure, the chamfer 9 of the casing 2 serves to deform the spring-steel latch element 3. Once installed, the element 3 is still elastically deformed somewhat, that is prestressed, to hold the plug 1 and charge 10 solidly in place. If an at least partially angularly extending, pin-shaped multi-section projection 8 is provided, both the charge-support plug 1 and also the latch element 3 have cutouts to fit with them. Such cutouts can for instance, be realized by means of the latch element 3 being in the form of curved washer with one or several radially outwardly open slots or the latch element 3 being realized as fan-shaped disk (see FIG. 2). FIG. 1 furthermore shows that the latch element 3 in a mounted state takes an angular form seen in the cross-section, wherein it particularly has an apex angle between 20° and 70°.

It is important that the latch element 3 be formed in a way that it and the charge-support plug 1 are fixed in the casing 2 so that in case of a crash the ignitable charge 10 of the charge-support plug 1 can operate against the X-direction and the plug 1 is supported on the casing 2 so that it does not move; instead the pin 11 blows out the front end (downward in FIG. 1).

Figure 2:
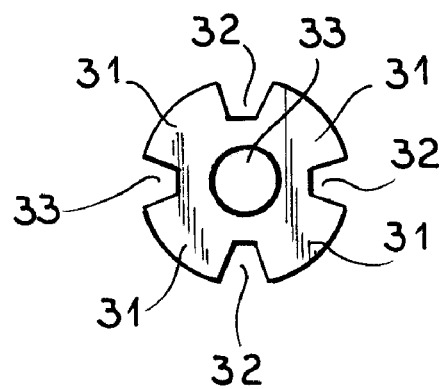
FIG. 2 is an end view of the latch element used in FIG. 1.

FIG. 2 shows an embodiment of the latch element 3 with a basically circular inner and outer periphery, having radially outwardly opening slots 32 forming wings 31, but otherwise being of circular inner and outer periphery. There are three such cutouts 32 and three such wings 31, angularly equis-paced about the element e, but the wings 31 have an angular dimension equal to about twice that of the cutouts, which themselves extend over about 30°. This construction has the required stability and resistance for fixing the charge-support plug 1 in the casing 2, but still has a sufficient deformability at least during assembly when the latch element 3 is inserted into the casing 2 past the chamfer 9. Finally, the latch element 3 has an central hole 33, by means of which it is conducted over the small-diameter rear end 17 through which extend the electrical connections 7 of the pyrotechnic charge 10. For the sake of completeness it shall be stated that the pyrotechnic charge 10 can have electrical connections 7 in the form of cables to an electric controller, pr can also have a connection assembly. Here, one could think of combining the connection assembly to be attached with the latch element, so that attaching the connection assembly with its latch element the pyrotechnic charge 10 not only fixes it in the casing 2 but also electrically connects it up.

Recapitulating, the pyrotechnic charge, which is installed into the casing 2 and fixed by means of the latch element 3, gives the possibility that the latch element 3 is installed, particularly pressed into the casing 2, whereby the advantage is given, that the charge-support plug 1 is then installed into the casing 2, when this or the entire safety system respectively, is available shortly before installing it into the vehicle or when it was already installed into the vehicle.

We claim:

1. A pyrotechnic release unit comprising:
  a generally tubular casing having an open rear end and an open front end and adapted to be secured to one of a pair of separable vehicle parts, the casing being formed at the rear end with a forwardly directed shoulder face;
  a pin releasably retained in the front end of the casing and adapted to be secured to the other of the pair of separable vehicle parts;
  a support plug fittable through the rear end into the casing, formed with a rearwardly directed shoulder face, and carrying a pyrotechnic charge turned toward the front end; and
  a washer through which the plug extends, bearing rearward on the shoulder face of the casing and forward on the shoulder face of the support plug, and sufficiently strong that on explosion of the charge the support plug remains fixed in the casing and the pin is blown out of the front end of the casing.

2. The pyrotechnic release unit defined in claim 1 wherein the washer is centered on an axis and formed with at least two radially outwardly open wing-defining slots.

3. The pyrotechnic release unit defined in claim 1 wherein the washer is dished.

4. The pyrotechnic release unit defined in claim 1 wherein the washer is of spring steel.

5. The pyrotechnic release unit defined in claim 1 wherein the washer is axially prestressed between the support plug and the casing.

6. The pyrotechnic release unit defined in claim 1 wherein the casing is formed at the rear end with an inwardly open groove having the forwardly directed shoulder against which the washer bears.

7. The pyrotechnic release unit defined in claim 6 wherein the groove has a rearwardly flaring frustoconical front flank.

8. The pyrotechnic release unit defined in claim 1 wherein the casing has an inward projection against which the washer bears rearwardly.

9. The pyrotechnic release unit defined in claim 1 wherein the rear end of the casing is formed with a chamfered inner edge.

10. The pyrotechnic release unit defined in claim 1 wherein the charge has electrical leads extending through the support plug out the rear end of the casing.

11. A pyrotechnic release unit comprising:

a generally tubular casing centered on and extending along an axis, having an axially open rear end and an opposite axially open front end, adapted to be secured to one of a pair of separable vehicle parts, and formed at the rear end with a radially inwardly open groove having a generally planar forwardly directed rear face and a frustoconical rearwardly directed front face;

a pin releasably retained in the front end of the casing and adapted to be secured to the other of the pair of separable vehicle parts;

a support plug fittable through the rear end into the casing, formed with a rearwardly directed and generally planar shoulder face, and carrying a pyrotechnic charge turned toward the front end; and a spring-steel dished latch washer surrounding the plug, having an outer periphery bearing rearward on the shoulder face of the casing and an inner bearing forward on the shoulder face of the support plug, and sufficiently strong that on explosion of the charge the support plug remains fixed in the casing and the pin is blown out of the front end of the casing.

* * * * *